United States Patent
Uchino et al.

(10) Patent No.: US 11,219,067 B2
(45) Date of Patent: Jan. 4, 2022

(54) RADIO BASE STATION AND MOBILE STATION FOR PERFORMING COMMUNICATIONS BY AGGREGATING CELLS UNDER DIFFERENT RADIO BASE STATIONS

(71) Applicant: NTT DOCOMO, INC., Tokyo (JP)

(72) Inventors: Tooru Uchino, Tokyo (JP); Hideaki Takahashi, Tokyo (JP); Yuta Sagae, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 298 days.

(21) Appl. No.: 14/433,115

(22) PCT Filed: Oct. 3, 2013

(86) PCT No.: PCT/JP2013/076912
§ 371 (c)(1),
(2) Date: Apr. 2, 2015

(87) PCT Pub. No.: WO2014/054722
PCT Pub. Date: Apr. 10, 2014

(65) Prior Publication Data
US 2015/0250004 A1    Sep. 3, 2015

(30) Foreign Application Priority Data

Oct. 5, 2012    (JP) .............................. JP2012-223599

(51) Int. Cl.
*H04W 74/08*    (2009.01)
*H04W 72/04*    (2009.01)
(Continued)

(52) U.S. Cl.
CPC ....... *H04W 74/0833* (2013.01); *H04W 16/18* (2013.01); *H04W 72/04* (2013.01);
(Continued)

(58) Field of Classification Search
CPC .. H04W 74/0833; H04W 16/18; H04W 72/04
See application file for complete search history.

(56) References Cited

U.S. PATENT DOCUMENTS

2002/0002063 A1\*    1/2002   Miyamoto ............ H04W 36/18
                                                        455/560
2007/0081492 A1\*    4/2007   Petrovic ................ H04L 1/1812
                                                        370/331
(Continued)

FOREIGN PATENT DOCUMENTS

CN        102123516 A        7/2011
CN        102624494 A        8/2012
(Continued)

OTHER PUBLICATIONS

International Search Report for corresponding International Application No. PCT/JP2013/076912, dated Dec. 24, 2013 (2 pages).
(Continued)

*Primary Examiner* — Jael M Ulysse
(74) *Attorney, Agent, or Firm* — Osha Bergman Watanabe & Burton LLP

(57) ABSTRACT

An objective is to enable communications properly using an Scell even in a case where a radio base station which transmits "Activate command" and a radio base station which manages an Scell are different when "Inter-site CA" is performed. A radio base station eNB #1 according to the invention includes a transmission unit 12 configured to transmit an "Activate command" which is a command to activate a cell #B to a mobile station UE and thereafter notify a radio base station eNB #10 that the cell #B is activated.

1 Claim, 8 Drawing Sheets

(51) Int. Cl.
*H04W 16/18* (2009.01)
*H04W 28/16* (2009.01)
*H04L 5/00* (2006.01)

(52) U.S. Cl.
CPC ............ *H04L 5/001* (2013.01); *H04L 5/0098* (2013.01); *H04W 28/16* (2013.01)

(56) References Cited

U.S. PATENT DOCUMENTS

| | | | |
|---|---|---|---|
| 2007/0155388 A1* | 7/2007 | Petrovic | H04W 36/30 455/442 |
| 2009/0238144 A1* | 9/2009 | Cave | H04W 36/0079 370/331 |
| 2009/0316653 A1* | 12/2009 | Meyer | H04W 74/002 370/331 |
| 2009/0316811 A1* | 12/2009 | Maeda | H04W 76/11 375/260 |
| 2010/0142470 A1* | 6/2010 | Park | H04L 1/1854 370/329 |
| 2010/0303039 A1* | 12/2010 | Zhang | H04L 5/0035 370/331 |
| 2010/0316026 A1* | 12/2010 | Lee | H04L 1/0028 370/336 |
| 2011/0026475 A1* | 2/2011 | Lee | H04L 5/001 370/329 |
| 2011/0105136 A1* | 5/2011 | Choi | H04W 48/08 455/452.1 |
| 2011/0134774 A1* | 6/2011 | Pelletier | H04L 5/001 370/252 |
| 2011/0194493 A1* | 8/2011 | Centonza | H04W 52/0235 370/328 |
| 2011/0201339 A1* | 8/2011 | Kuningas | H04W 36/0055 455/436 |
| 2011/0243106 A1* | 10/2011 | Hsu | H04W 72/1284 370/336 |
| 2011/0244860 A1* | 10/2011 | Wu | H04W 74/0833 455/436 |
| 2011/0269469 A1* | 11/2011 | Xiao | H04W 36/0072 455/436 |
| 2011/0281615 A1* | 11/2011 | Yamada | H04W 36/0094 455/524 |
| 2011/0305183 A1* | 12/2011 | Hsu | H04W 72/005 370/312 |
| 2011/0310753 A1* | 12/2011 | Chou | H04W 48/16 370/252 |
| 2012/0002643 A1* | 1/2012 | Chung | H04W 74/0833 370/331 |
| 2012/0014357 A1* | 1/2012 | Jung | H04L 5/0035 370/332 |
| 2012/0057544 A1 | 3/2012 | Xu et al. | |
| 2012/0076042 A1* | 3/2012 | Chun | H04W 74/0833 370/252 |
| 2012/0076088 A1* | 3/2012 | Hwang | H04W 72/1289 370/329 |
| 2012/0093103 A1* | 4/2012 | Lee | H04L 5/0053 370/329 |
| 2012/0093128 A1* | 4/2012 | Song | H04W 36/0077 370/331 |
| 2012/0100860 A1* | 4/2012 | Lei | H04W 36/20 455/438 |
| 2012/0135771 A1* | 5/2012 | Futaki | H04B 7/024 455/509 |
| 2012/0140689 A1* | 6/2012 | Pelletier | H04L 5/0005 370/311 |
| 2012/0142361 A1* | 6/2012 | Zhao | H04W 36/28 455/446 |
| 2012/0157101 A1* | 6/2012 | Uemura | H04L 5/001 455/436 |
| 2012/0176926 A1* | 7/2012 | Jang | H04W 24/02 370/252 |
| 2012/0213207 A1* | 8/2012 | Jang | H04W 24/10 370/336 |
| 2012/0218973 A1* | 8/2012 | Du | H04W 36/14 370/331 |
| 2012/0230265 A1* | 9/2012 | Lee | H04L 5/003 370/329 |
| 2012/0257510 A1* | 10/2012 | Jeong | H04L 5/0098 370/242 |
| 2012/0257569 A1* | 10/2012 | Jang | H04L 5/001 370/328 |
| 2012/0257570 A1* | 10/2012 | Jang | H04L 5/001 370/328 |
| 2012/0281667 A1* | 11/2012 | Chang | H04L 5/001 370/329 |
| 2012/0300715 A1* | 11/2012 | Pelletier | H04W 56/0005 370/329 |
| 2012/0307751 A1* | 12/2012 | Dinan | H04L 5/0007 370/329 |
| 2013/0010641 A1* | 1/2013 | Dinan | H04W 36/0072 370/254 |
| 2013/0010716 A1* | 1/2013 | Dinan | H04W 76/025 370/329 |
| 2013/0021996 A1* | 1/2013 | Wang | H04W 72/082 370/329 |
| 2013/0064226 A1* | 3/2013 | Dinan | H04W 36/30 370/332 |
| 2013/0250908 A1* | 9/2013 | Bach | H04W 52/0206 370/331 |
| 2013/0252660 A1* | 9/2013 | Bach | H04W 52/0206 455/525 |
| 2014/0044074 A1 | 2/2014 | Chen et al. | |

FOREIGN PATENT DOCUMENTS

| | | |
|---|---|---|
| EP | 2323304 A2 | 5/2011 |
| EP | 2360866 A1 | 8/2011 |
| EP | 2 809 106 A1 | 12/2014 |
| JP | 2011-142539 A | 7/2011 |
| JP | 2012-516086 A | 7/2012 |
| WO | 2011063244 A2 | 5/2011 |
| WO | 2013/111818 A1 | 8/2013 |

OTHER PUBLICATIONS

Written Opinion for corresponding International Application No. PCT/JP2013/076912, dated Dec. 24, 2013 (5 pages).
3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Sep. 2012 (205 pages).
Extended Search Report issued corresponding European Application No. 13843385.9, dated Apr. 20, 2016 (10 pages).
Huawei; "Overview to LTE energy saving solutions to cell switch off/on"; 3GPP TSG-RAN WG3#66bis, R3-100162 Valencia, Spain; Jan. 18-22, 2010 (5 pages).
Office Action issued in corresponding Japanese Application No. 2012-223599, dated Feb. 9, 2016 (6 pages).
InterDigital; "Considerations for multipoint transmissions"; 3GPP TSG-RAN WG2 Meeting #74, R2-114369; Athens, Greece; Aug. 22-28, 2011 (3 pages).
ITRI; "Considerations on Random Access on SCell"; 3GPP TSG RAN WG2 #74, R2-113192; Barcelona, Spain; May 9-13, 2011 (4 pages).
LG Electronics Inc.; "SCell RACH initiation"; 3GPP TSG-RAN2 Meeting #74, R2-1113257; Barcelona, Spain; May 9-13, 2011 (2 pages).
Office Action issued in the counterpart European Patent Application No. 13843385.9, dated Apr. 26, 2017 (7 pages).
Office Action issued in the counterpart Canadian Patent Application No. 2886799, dated Apr. 4, 2017 (5 pages).
Office Action issued in the counterpart Chinese Patent Application No. 201380051443.7, dated Oct. 10, 2017 (14 pages).

* cited by examiner

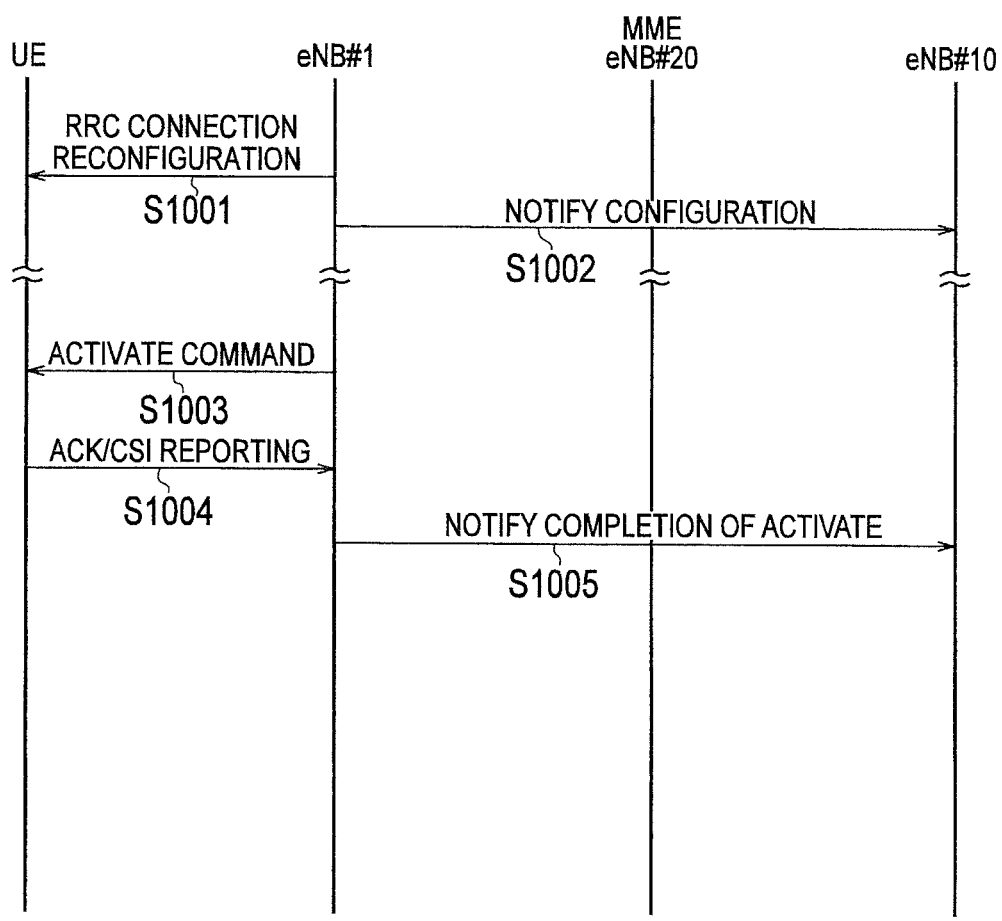

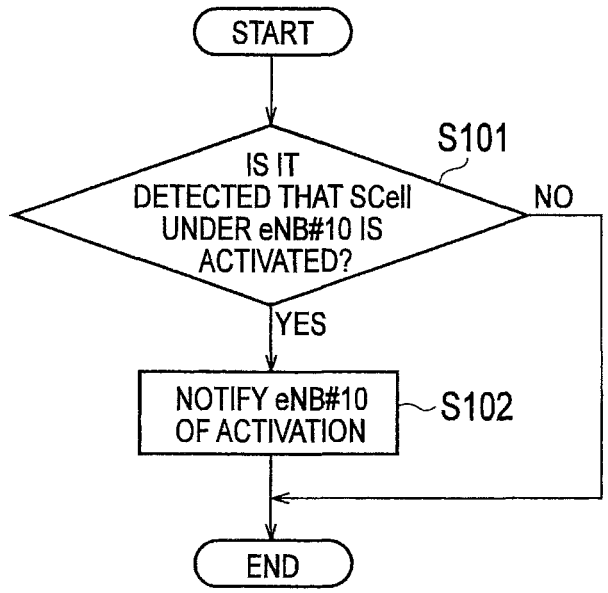
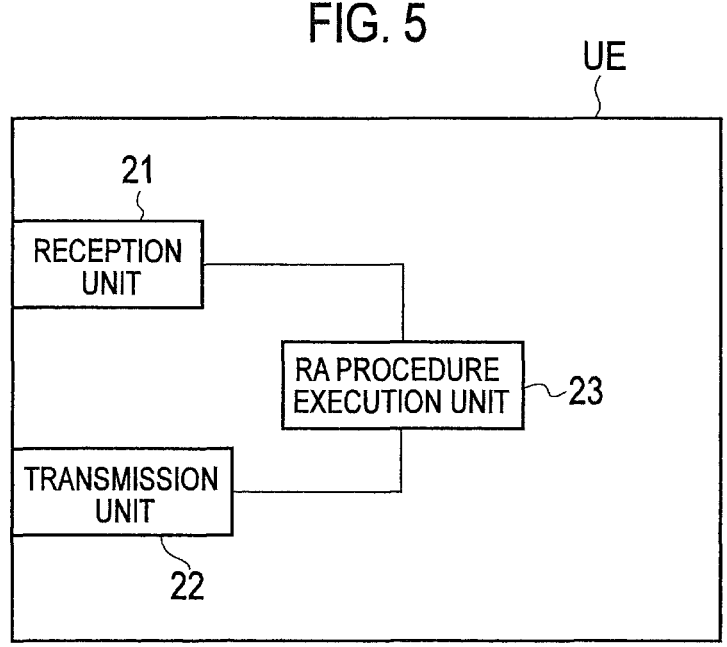

INTRA-eNB CA

INTER-SITE CA

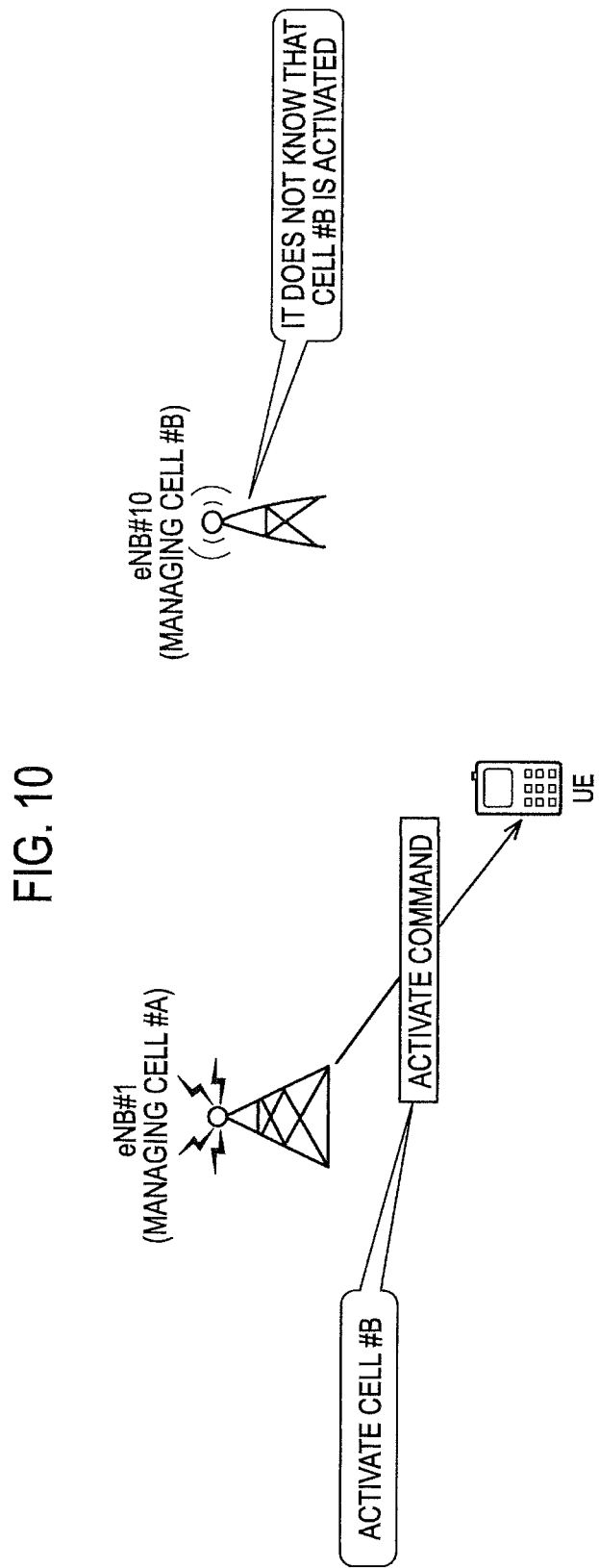

RADIO BASE STATION AND MOBILE STATION FOR PERFORMING COMMUNICATIONS BY AGGREGATING CELLS UNDER DIFFERENT RADIO BASE STATIONS

TECHNICAL FIELD

The present invention relates to a radio base station and a mobile station.

BACKGROUND ART

As illustrated in FIG. 8, to achieve wideband communications exceeding 20 MHz (for example, 100 MHz communications) in Release-10 of LTE (Long Term Evolution), CA (Carrier Aggregation) has been introduced through which communications are performed by aggregating multiple cells (or CC: Component Carrier) under a same radio base station eNB.

When the CA is performed, a Pcell (Primary cell) which is a cell with high reliability of guaranteeing connectivity and an Scell (Secondary cell) which is a supplementary cell are configured for a mobile station UE.

The mobile station UE can firstly connect with a Pcell and then add an Scell as needed.

The Pcell is a cell similar to a cell in LTE supporting RLM (Radio Link Monitoring), SPS (Semi-Persistent Scheduling) and the like. When the Pcell of the mobile station UE is changed, handover processing is needed.

Also, the Scell is a cell configured for a mobile station UE in addition to the Pcell. To add or delete the Scell is performed by RCC (Radio Resource Control) signaling.

The Scell is in a non-active state just after being configured for the mobile station UE, and becomes capable of communications (capable of scheduling or feedback of the channel information) only by being activated in a MAC (Media Access Control) layer.

Later, "Small Cell enhancement" has been proposed in LTE Release-12 or beyond, and introduction of "Inter-site CA" in which communications are performed by aggregating CCs (cells) under different radio base stations eNB has been discussed as one of more flexible network architecture than a conventional one (see FIG. 9).

For example, as illustrated in FIG. 9, by use of the "Inter-site CA", it is possible to perform an operation that a C-plane signal which requires reliability is communicated in a cell #A (macro cell) under a radio base station eNB #1 through SRB (Signaling Radio Bearer) and a U-plane signal which requires wideband communications is communicated in a cell #B (small cell) under a radio base station eNB #10 through DRB (Data Radio Bearer).

As described above, when the C-plane signal is communicated in the cell #A under the radio base station eNB #1 through SRB and the U-plane signal is communicated in the cell #B under the radio base station eNB #10 through DRB, it is assumed that the radio base station eNB #1 basically handles connectivity or settings between the mobile station UE and the radio base station eNB #1/radio base station eNB #10 as illustrated in FIG. 9.

In this case, it is assumed that, basically, the cell #A (macro cell) is configured as a Pcell with high reliability and the cell #B is configured as a supplementary Scell.

PRIOR ART DOCUMENT

Non-Patent Document

Non-patent document 1: 3GPP TS36.300

SUMMARY OF THE INVENTION

As described above, in order for a mobile station UE to perform communications using an Scell, the Scell needs to be activated. However, there is a possibility that a radio base station transmitting "Activate command," which is a command to activate the Scell, and a radio base station eNB which manages the Scell are different.

Specifically, as illustrated in FIG. 10, when an activated Scell of the mobile station UE does not exist under the radio base station eNB #10, the radio base station eNB #10 cannot transmit "Activate command" to activate the Scell under the radio base station eNB #10 to the mobile station UE. Accordingly, there is a possibility that a radio base station eNB #1 transmits the "Activate command" to the mobile station UE.

In such a case, the radio base station eNB #10 does not have a way to know when the Scell under the radio base station eNB #10 is activated. Accordingly, there is a problem that the radio base station eNB #10 cannot recognize that from when scheduling becomes possible in the Scell.

For this reason, the invention has been made with a view to the foregoing problem. An objective of the invention is to provide a radio base station and a mobile station, with which even in a case where a radio base station which transmits "Activate command" and a radio base station which manages an Scell are different when "Inter-site CA" is performed, communications can be performed properly using the Scell.

A first feature of the present invention is summarized as a radio base station which is configured to be capable of functioning as a first radio base station in a mobile communication system allowing a mobile station to perform carrier aggregation using a first cell managed by the first radio base station and a second cell managed by a second radio base station, the radio base station including: a transmission unit configured to transmit a command to activate the second cell to the mobile station, and thereafter, notify the second radio base station that the second cell is activated.

A second feature of the present invention is summarized as a mobile station configured to be capable of performing carrier aggregation using a first cell managed by a first radio base station and a second cell managed by a second radio base station, the mobile station including: a reception unit; and a random access procedure execution unit configured to execute a random access procedure. Here, the reception unit receives a command to activate the second cell from the first radio base station, and thereafter, the random access procedure execution unit executes a random access procedure with the second radio base station.

BRIEF DESCRIPTION OF THE DRAWINGS

FIG. 3 is a sequence diagram illustrating an operation of the mobile communication system according to the first embodiment of the invention.

FIG. 4 is a flowchart illustrating an operation of the radio base station according to the first embodiment of the invention.

FIG. 5 is a functional block diagram of a mobile station UE according to Modification 1 of the invention.

FIG. 10 is a diagram for illustrating the conventional technology.

MODES FOR CARRYING OUT THE INVENTION (Mobile Communication System According to a First Embodiment of the Invention)

A mobile communication system according to a first embodiment of the present invention is described by referring to FIGS. 1 to 4.

Figure 1:
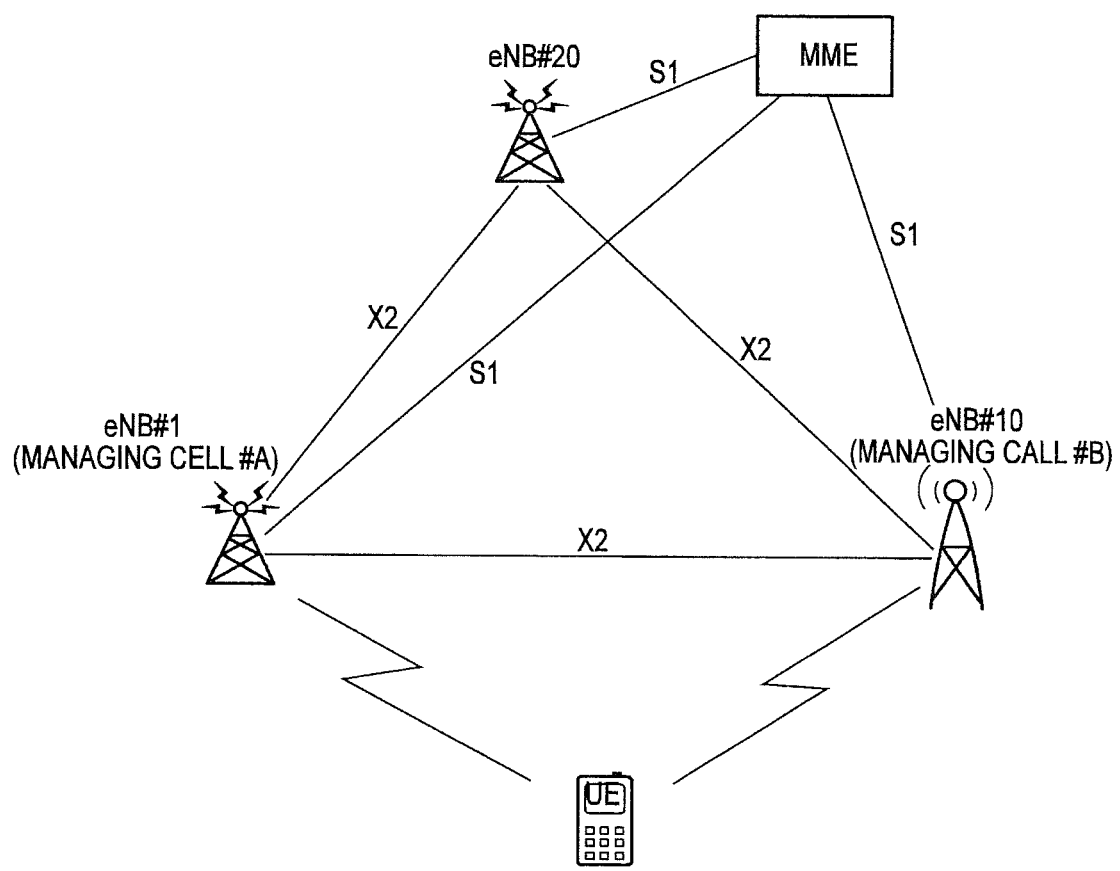
FIG. 1 is an overall configuration diagram of a mobile communication system according to a first embodiment of the invention.

As illustrated in FIG. 1, a mobile communication system according to the embodiment is an LTE-Advanced mobile communication system, which includes a mobile management node MME, a radio base station eNB #1 managing a cell #A, a radio base station eNB #10 managing a cell #B, and a radio base station eNB #20 functioning as an anchor radio base station eNB.

It is assumed in the embodiment that the cell #A is configured as a Pcell of a mobile station UE and the cell #B is configured as an Scell of the mobile station UE. Also, the cell #A may be a macrocell and the cell #B may be a small cell. In addition, the cell #A may be an activated Scell.

In the mobile communication system according to the embodiment, the mobile station UE is configured so that a CA, specifically, "Inter-site CA," can be performed by using the cell #A and cell #B.

An X2 interface connects between the radio base station eNB #1 and the radio base station eNB #10, between the radio base station eNB #1 and the radio base station eNB #20, and between the radio base station eNB #10 and the radio base station eNB #20.

Furthermore, an S1 interface connects between the radio base station eNB #1 and the mobile management node MME, between the radio base station eNB #10, and the mobile management node MME and between the radio base station eNB #20 and the mobile management node MME.

Figure 2:
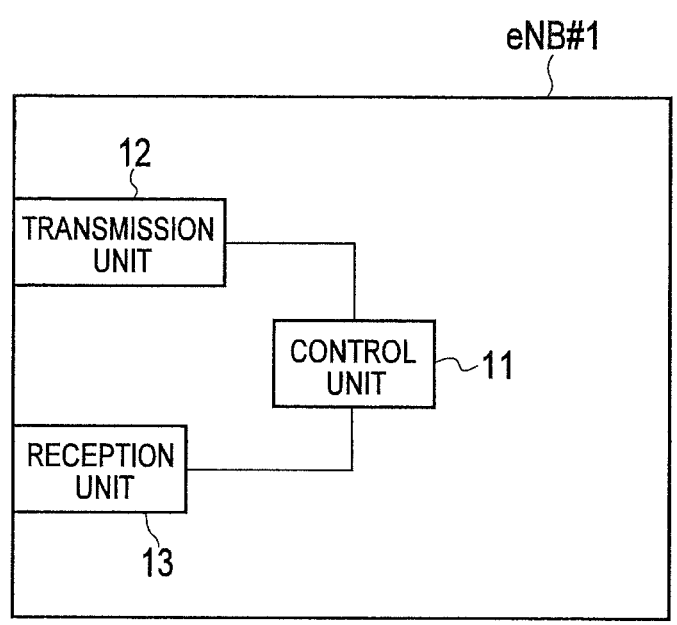
FIG. 2 is a functional block diagram of a radio base station eNB #1 according to the first embodiment of the invention.

As illustrated in FIG. 2, the radio base station eNB #1 according to the embodiment includes a control unit 11, a transmission unit 12, and a reception unit 13.

The control unit 11 is configured to perform various kinds of control in the radio base station eNB #1. The transmission unit 12 is configured to transmit various kinds of signals to the mobile station UE, the radio base stations eNB #10/#20, the mobile management node MME, and the like. The reception unit 13 is configured to receive various kinds of signals from the mobile station UE, the radio base stations eNB #10/eNB #20, the mobile management node MME, and the like.

In addition, the control unit 11 determines to configure the Pcell or Scell of the mobile station UE and instructs the transmission unit 12 of the configuration.

Also, the control unit 11 determines to activate the Scell of the mobile station UE and instructs the transmission unit 12 of the activation.

In response to the instruction from the control unit 11, the transmission unit 12 transmits "RRC Connection Reconfiguration" which instructs to configure the Pcell and Scell of the mobile station UE and transmits "Activate command" which instructs to determine activation of the Scell of the mobile station UE, to the mobile station UE.

In addition, the reception unit 13 receives ACK/NACK in response to the "Activate command" or receives "CSI reporting" in the cell #A/#B from the mobile station UE.

Then, when there is no active cell of the mobile station UE under the radio base station eNB #10, the transmission unit 12 transmits an "Activate command" which instructs to activate the cell #B to the mobile station UE, and thereafter, notifies the radio base station eNB #10 which manages the cell #B that the cell #B is activated. The radio base station eNB #10 may transmit a response signal in response to the notification to the radio base station #1.

For example, when the transmission unit 12 transmits the "Activate command" and then the reception unit 13 receives ACK in response to the "Activate command," the transmission unit 12 may perform the above notification.

In addition, when the transmission unit 12 transmits the "Activate command" and then the reception unit 13 receives the "CSI reporting" in the cell #B, the transmission unit 12 may perform the above notification.

Here, the transmission unit 12 may perform the above notification though the X2 interface or may perform the above notification through the S1 interface with the mobility management node MME, or may perform the above notification through the anchor radio base station eNB #20.

Here, the transmission unit 12 may notifies the radio base station eNB #10 managing the cell #B that the cell #B is configured after transmitting "RRC Connection Reconfiguration" instructing to configure the cell #B to the mobile station UE.

In addition, the order of the timing of transmitting the "RRC Connection Reconfiguration" which instructs to configure the cell #B to the mobile station UE and the timing of notifying the radio base station eNB #10 managing the cell #B that the cell #B is configured may be changed.

Hereinafter, described by referring to FIG. 3 is an operation of the mobile communication system according to the embodiment.

As illustrated in FIG. 3, at step S1001, the radio base station eNB #1 transmits, to the mobile station UE, "RRC Connection Reconfiguration" which instructs to configure the cell #B as the Scell of the mobile station UE.

At step S1002, the radio base station eNB #1 may notify the radio base station eNB #10 managing the cell #B that the cell #B is configured.

At step S1003, the radio base station eNB #1 transmits "Activate command" which instructs to activate the cell #B to the mobile station UE.

At step S1004, the mobile station UE transmits ACK in response to the "Activate command" to the radio base station eNB #1.

Then, the mobile station UE transmits the "CSI reporting" in the cell #B to the radio base station eNB #1 after activating the cell #B.

At step S1005, the radio base station eNB #1 notifies the radio base station eNB #10 managing the cell #B that the cell #B is activated.

Hereinafter, described by referring to FIG. 4 is an operation of the radio base station eNB #1 according to the embodiment.

As illustrated in FIG. 4, when it is detected at step S101 that the cell #B (Scell) under the radio base station eNB #10 is activated, the radio base station eNB #1 notifies the radio base station eNB #10 at step S102 that the cell #B (Scell) is activated.

(Modification 1)

Figure 6:
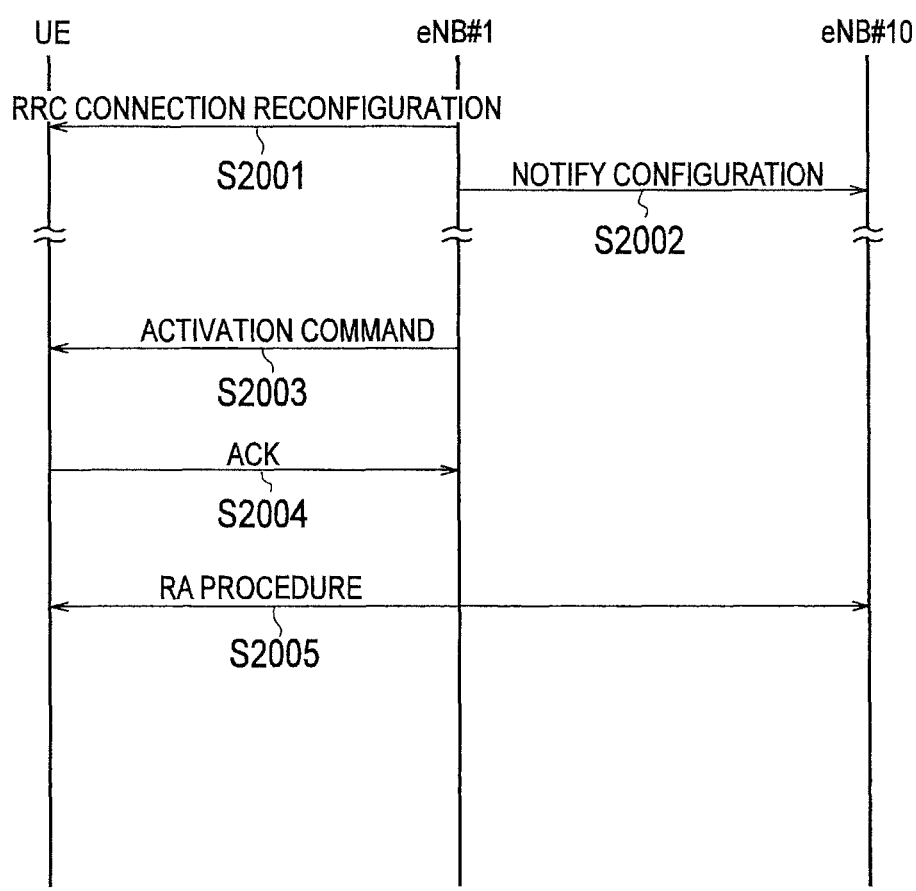
FIG. 6 is a sequence diagram illustrating an operation of a mobile communication system according to Modification 1 of the invention.
Figure 7:
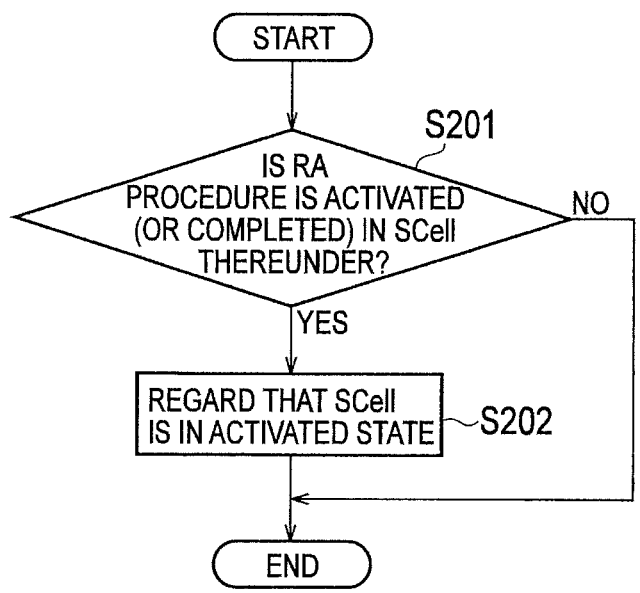
FIG. 7 is a flowchart illustrating an operation of the radio base station eNB #10 according to Modification 1 of the invention.
Figure 8:
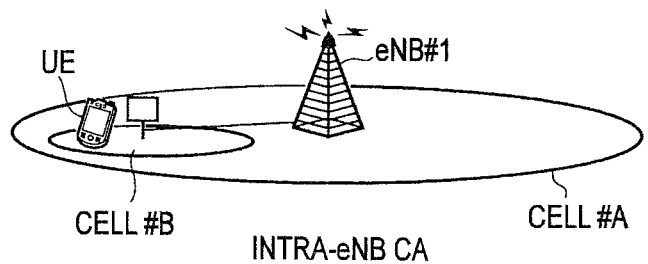
FIG. 8 is a drawing for illustrating a conventional technology.
Figure 9:
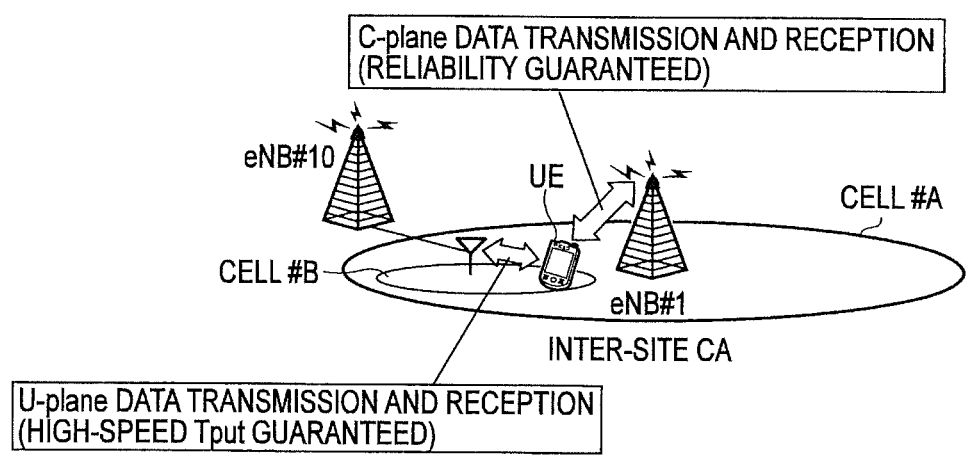
FIG. 9 is a diagram for illustrating the conventional technology.

Described hereinafter by referring to FIGS. 5 to 7 is a mobile communication system according to Modification 1 by paying attention to differences with the mobile communication system according to the first embodiment.

As illustrated in FIG. 5, a mobile station UE according to Modification 1 includes a reception unit 21, a transmission unit 22, and a RA (Random Access) procedure execution unit 23.

The reception unit 21 is configured to receive various kinds of signals from radio base stations eNB #1/#10. The transmission unit 22 is configured to transmit various kinds of signals to the radio base stations eNB #1/#10. The RA procedure execution unit 23 is configured to execute RA procedures with the radio base stations eNB #1/#10.

For example, after the reception unit 21 receives an "Activate command" which instructs to activate the cell #B under the radio base station eNB #10 from the radio base station eNB #1, the RA procedure execution unit 23 may execute the RA procedure with the radio base station eNB #10 at predetermined timing.

In addition, the predetermined timing may be timing when the "Activate command" is received, timing when the activation of the cell #B is completed, timing when the mobile station can feedback channel information of the cell #B, any timing between timing when the "Activate command" is received and timing when the activation of the cell #B is completed, or the longest timing during which the mobile station UE is required to activate the Scell.

Here, when the reception unit 21 receives the "Activate command" from the radio base station eNB #1, the RA procedure execution unit 23 may automatically execute the RA procedure with the radio base station eNB #10.

Alternately, when the reception unit 21 receives "PDCCH (Physical Downlink Control Channel) order" for the "Cross Carrier Scheduling" in the cell #B after receiving the "Activate command" from the radio base station eNB #1, the RA procedure execution unit 23 may execute the RA procedure with the radio base station eNB #10.

Here, the RA procedure execution unit 23 may execute the RA procedure by using a RA resource (for example, a RA permeable index) notified by the "RRC Connection Reconfiguration" or the like which instructs to configure the cell #B.

Described below by referring to FIG. 6 is an operation of the mobile communication system according to Modification 1.

As illustrated in FIG. 6, at step S2001, the radio base station eNB #1 transmits "RRC Connection Reconfiguration" which instructs to configure the cell #B as the Scell of the mobile station UE to the mobile station UE.

At step S2002, the radio base station eNB #1 may notify the radio base station eNB #10 which manages the cell #B that the cell #B is configured.

At step S2003, the radio base station eNB #1 transmits the "Activate command" which instructs to activate the cell #B to the mobile station UE.

At step S2004, the mobile station UE transmits ACK to the radio base station eNB #1 in response to the "Activate command."

At step S2005, the mobile station UE executes the RA procedure with the radio base station eNB #10 which manages the cell #B.

Described hereinafter by referring to FIG. 7 is an operation of the radio base station eNB #10 according to Modification 1.

As illustrated in FIG. 7, at step S201, when the radio base station eNB #10 detects that the RA procedure with the mobile station UE is activated (or terminated) in the cell #B (Scell) thereunder, it regards at step S202 that the cell #B (Scell) is activated.

The features of the present embodiment may also be expressed as follows.

A first feature of the present embodiment is summarized as a radio base station eNB #1 (first radio base station) in a mobile communication system allowing a mobile station UE to perform CA using a cell #A (first cell, Pcell or Scell) managed by the radio base station eNB #1 and a cell #B (second cell, Scell) managed by a radio base station eNB #10 (second radio base station), the radio base station eNB #1 including: the transmission unit 12 configured to transmit "Activate command" which is a command to activate the cell #B to the mobile station UE, and thereafter, notify the radio base station eNB #10 that the cell #B (Scell) is activated.

With this configuration, in a case where the radio base station eNB #1 which transmits the "Activate command" and the radio base station eNB #10 which manages the cell #B (Scell) are in different situations when the "Inter-site CA" is performed, the radio base station eNB #1 notifies the radio base station eNB #10 that the cell #B (Scell) is activated. Accordingly, this can avoid a case where the radio base station eNB #10 does not have a way to know when the cell #B (Scell) under the radio base station eNB #10 is activated and a case where it cannot know from when scheduling can be performed in the cell #B (Scell).

In the first feature of the present embodiment, the radio base station eNB #1 may include a reception unit 13 configured to receive ACK/NACK (acknowledgement information) in response to the "Activate command" from the mobile station UE. Here, the transmission unit 12 may make the notification when the reception unit 13 receives ACK (positive acknowledgement information) in response to the "Activate command" after the transmission unit 12 transmits the "Activate command."

With the above-described configuration, the radio base station eNB #1 confirms that the "Activate command" is securely delivered to the mobile station UE, and then can notify the radio base station eNB #10 that the cell #B (Scell) is activated. Accordingly, a gap in perception whether or not the cell #B (Scell) is activated can be eliminated between the radio base station eNB #1 and the radio base station eNB #10.

In the first feature of the present embodiment, the radio base station eNB #1 may include a reception unit 13 configured to receive "CSI reporting (channel state report)" in the cell #B (Scell) from the mobile station UE. Here, the transmission unit 12 may make the notification when the reception unit 13 receives the "CSI reporting" in the cell #B (Scell) after the transmission unit 12 transmits the "Activate command."

With the above-described configuration, the radio base station eNB #1 confirms that the "Activate command" is surely delivered to the mobile station UE and then can notify the radio base station eNB #10 that the cell #B (Scell) is activated. According, a gap in perception whether or not the cell #B (Scell) is activated between the radio base station eNB #1 and the radio base station eNB #10 can be eliminated.

In the first feature of the present embodiment, the transmission unit 12 may make the notification to the radio base station eNB #10 through a mobile management node MME or an anchor radio base station eNB #20.

With the above-described configuration, the radio base station eNB #1 can perform the above notification even when the X2 interface is not established with the radio base station eNB #10.

A second feature of the present embodiment is summarized as a mobile station UE configured to be capable of performing CA using a cell #A (Pcell/Scell) managed by a radio base station eNB #1 and a cell #B (Scell) managed by a radio base station eNB #10, the mobile station UE including: a reception unit 21; and an RA procedure execution unit 23 configured to execute an RA procedure (random access procedure). Here, the reception unit 21 may receive "Activate command" which is a command to activate the cell #B (Scell) from the radio base station eNB #1, and thereafter, the RA procedure execution unit 23 may execute an RA procedure with the radio base station eNB #10.

With the above-described configuration, in a case where the radio base station eNB #1 which transmits the "Activate command" and the radio base station eNB #10 which manages the cell #B (Scell) are in different situations when the "Inter-site CA" is performed, the mobile station UE performs the RA procedure with the radio base station eNB #10 (in the cell #B), so as to notify the radio base station eNB #10 that the cell #B (Scell) is activated. Accordingly, this can avoid a case in which the radio base station eNB #10 does not have a way to know when the cell #B (Scell) under the radio base station eNB #10 is activated and a case where it cannot know from when scheduling can be performed in the cell #B (Scell).

In addition, since the RA procedure is executed with the radio base station eNB #10, it can be surely confirmed that the cell #B (Scell) is actually activated and thus the scheduling can be soon possible.

In the second feature of the present embodiment, the RA procedure execution unit 23 may execute the RA procedure with the radio base station eNB #2 according a scheduling signal from the radio base station eNB #1.

With the above-described configuration, the mobile station UE can execute the RA procedure with the radio base station eNB #2 after the radio base station eNB #1 confirms that the cell #B is activated.

It should be noted that the foregoing operations of the mobile stations UE, the radio base stations eNB #1/#2/#10, and the mobile management node MME may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE, the radio base stations eNB #1/#2/#10, and the mobile management node MME. Otherwise, the storage medium and the processor may be provided as discrete components inside the mobile stations UE, the radio base stations eNB #1/#2/#10, and the mobile management node MME.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-223599 (filed on Oct. 5, 2012) is incorporated by reference in the present specification.

INDUSTRIAL APPLICABILITY

As described above, provided are a radio base station and a mobile station in which communications are possible properly using an Scell even in a case where a radio base station which transmits "Activate command" and a radio base station which manages an Scell are different when "Inter-site CA" is performed.

EXPLANATION OF REFERENCE NUMERALS eNB #1, eNB #2, eNB #10 radio base station
UE mobile station
11 control unit
12, 22 transmission unit
13, 21 reception unit
23 RA procedure execution unit

The invention claimed is:
1. A mobile station comprising:
a receiver; and
a processor coupled to the receiver, wherein the processor is configured to execute a random access procedure, wherein
the mobile station performs carrier aggregation by aggregating a first cell managed by a first radio base station and a second cell managed by a second radio base station, and
the processor executes a random access procedure with the second radio base station at a timing when an activation of the second cell is completed,
wherein the mobile station executes the random access procedure:
without receiving any command for executing the random access procedure from the first radio base station and the second radio base station, and
based on only when the receiver receives a command to activate the second cell from the first radio base station, and
wherein the mobile station transmits an acknowledgement signal to the first radio base station in response to receiving the command to activate the second cell and prior to executing the random access procedure with the second radio base station.

* * * * *